United States Patent Office 3,544,538
Patented Dec. 1, 1970

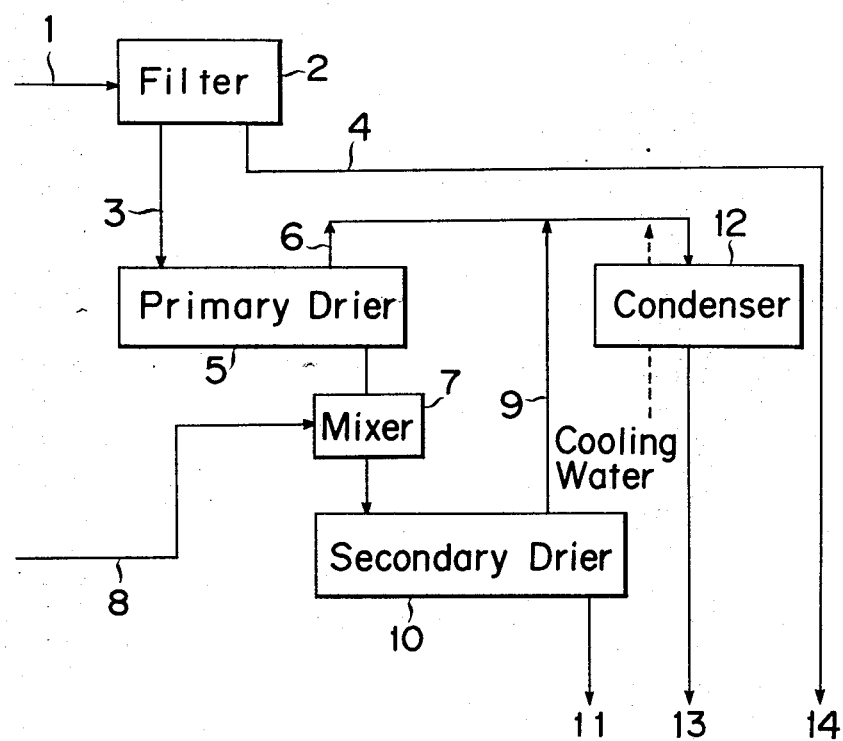

3,544,538
PRODUCTION OF HIGHLY SAPONIFIED
POLYVINYL ALCOHOL
Shiro Masuda and Kozo Konishi, both of 1277 Ohaza Ohmi, Ohmi-machi Nishi, Kubiki-gun, Niigata-ken, Japan
Continuation-in-part of application Ser. No. 399,500, Sept. 28, 1964. This application May 20, 1968, Ser. No. 730,597
Int. Cl. C08f 3/34
U.S. Cl. 260—91.3                    2 Claims

ABSTRACT OF THE DISCLOSURE

Highly saponified and purified polyvinyl alcohol from polyvinyl acetate can be obtained with a remarkably small amount of alkaline catalyst by partly drying the wet cake of filtered polyvinyl alcohol, adding a small amount of alkaline catalyst to the partly dried cake and final drying it thoroughly.

CROSS-REFERENCES TO RELATED APPLICATIONS

This is a continuation-in-part of application Ser. No. 399,500, filed on Sept. 28, 1964, now abandoned.

This invention relates to the production of polyvinyl alcohol by saponifying polyvinyl acetate, and more particularly to a process of converting polyvinyl acetate into polyvinyl alcohol with a high percentage of conversion.

Polyvinyl acetate is prepared in accordance with well known procedures by the polymerization of vinyl acetate, and it has been previously proposed to convert polyvinyl acetate into polyvinyl alcohol by saponification or alcoholysis.

In polyvinyl alcohol utilized as a raw material for preparing synthetic fibers, it is highly desirable to reduce as far as possible residual acetate groups contained in the polymerized molecules thereof, usually to an amount less than 0.1 mole percent, in order to improve the crystallinity of the fiber. However the amount of the residual acetate groups contained in commercial polyvinyl alcohol prepared by usual industrial process of saponification or alcoholysis generally amounts to about from 0.3 to 1.0 mole percent. Accordingly, in order to satisfactorily utilize it as the raw material for the preparation of synthetic fibers, it is essential to decrease beforehand the amount of said residual acetate groups by suitably resaponifying the polyvinyl alcohol.

An object of this invention is to provide a novel process of producing a high purity polyvinyl alcohol in the form of powder or granules which is particularly suitable as a raw material for synthetic fibers.

Another object of this invention is to provide an improved process of preparing polyvinyl alcohol containing less than 0.1 mole percent of the residual acetate groups wherein the desired polyvinyl alcohol is directly prepared from polyvinyl acetate by using only a small amount of alkali.

Still another object of this invention is to provide a novel industrial method of preparing high purity polyvinyl alcohol continuously and economically.

The above objects may be attained in accordance with this invention by resaponifying the residual acetyl groups contained in the polyvinyl alcohol.

It is a feature of this invention to effect said saponification process by partially drying a filtered cake of polyvinyl alcohol, adding thereto a very small amount of alkaline catalyst, and fully drying the cake concurrently with resaponification.

While the specification concludes with claims particularly pointing out and distinctly claiming the subject matter which are regarded as the invention, it is believed that the invention will be better understood from the following description taken in connection with the accompanying drawing in which a single figure illustrates a flow diagram of an industrial plant adapted to produce continuously highly saponified polyvinyl alcohol in accordance with the novel method.

In one prior method of preparing highly saponified polyvinyl alcohol, especially one containing less than 0.1 mole percent of the residual acetate groups, it has been the practice to dissolve in hot water powdery polyvinyl alcohol prepared by the usual method, and to add alkali into the solution whereby to resaponify the polyvinyl alcohol in the form of an aqueous solution.

While such method is preferred for the preparation of fibers by wet spinning method, it is not suitable for the preparation of fibers by dry spinning method. Preparation of fibers according to the dry spinning method starting from the conventional powdery polyvinyl alcohol is not satisfactory due to change in color of the fiber owing to the presence of inorganic salts contained in the polyvinyl alcohol. Where the dry spinning method is used, it is necessary to use purified polyvinyl alcohol obtained by dissolving the powdery polyvinyl alcohol in an organic solvent and then recrystallizing the same by salting out. However this process of purification is not practical since it is very troublesome.

In order to provide a high grade polyvinyl alcohol suitable for use in dry type spinning method, if the saponification is effected by using a large quantity of alkali, say, for instance, more than one mole of alkali for one mole of polyvinyl acetate, it would be possible to provide high purity polyvinyl alcohol containing less than 0.1 mole percent of the residual acetate groups in a single step. However, the said method is not only uneconomical in view of large quantity of alkali used, but also disadvantageous in that a large quantity of sodium acetate results from the reaction between methyl acetate, which is a by-product of the saponification reaction, and any excess alkali, so that repurification of the polyvinyl alcohol produced and recovering of sodium acetate must be carried out carefully and troublesomely.

This invention contemplates provision of an improved industrial method of directly producing powdery or granular polyvinyl alcohol containing less than 0.1 mole percent of the residual acetate groups by using a small quantity of alkali.

More particularly, in the first step of the process, a slurry is produced consisting of a mixture of polyvinyl alcohol containing from 0.3 to 1.0 mole percent of the residual acetate groups, methyl acetate and sodium acetate, and excess methanol by effecting saponification reaction by adding a suitable amount of sodium methylate or sodium hydroxide into methanolic solution of polyvinyl acetate according to a well known method. The slurry of polyvinyl alcohol thus obtained is then filtered to separate liquid and solid, and the resulting wet cake of polyvinyl alcohol is heated in a drier while subjected to agitation to distil off more than ⅓ of the volatile components contained in the cake. After sprinkling and mixing a very small amount of alkaline solution to the cake, the drying operation is continued to effect simultaneous resaponification reaction of the residual acetate groups and drying of the polyvinyl alcohol.

To describe the process of this invention in greater detail, a methanolic solution of polyvinyl acetate of the concentration from 10 to 50% is added alkali metal hydroxide or alkali metal alcoholate in an amount of from $1/100$ to $1/10$ mole of alkali per one mole of polyvinyl acetate. The mixture reacts at a temperature of from 20 to 60° C. to saponify polyvinyl acetate, thus producing a slurry containing suspended particles of polyvinyl alcohol including 0.3 to 1.0 mole percent of the residual acetate groups. Wet cake of the polyvinyl alcohol which has been separated from the slurry by filtering is then dried while agitated to distill off about $1/3$ to $2/3$ of the volatile components contained in the cake whereby to obtain partly dried granular or powdery polyvinyl alcohol. A very small amount, in the range of $1/2000$ to $1/40$ mole per one mole of the polyvinyl alcohol, of alkaline catalyst is sprinkled on and mixed with the powdery polyvinyl alcohol, followed by drying with concurrent resaponification of the residual acetate groups contained in the polyvinyl alcohol molecules.

The mechanism of providing powdery or granular polyvinyl alcohol, containing less than 0.1 mole percent of the residual acetate groups, through the use of very small amount of alkaline catalyst in accordance with the process of this invention can be explained as follows. At first, by filtering the slurry of polyvinyl alcohol the major portion of methyl acetate dissolved in the liquid would be removed, and then upon distilling off about $1/3$ to $2/3$ of the remaining volatile component, we have found that the majority of the methyl acetate that has remained in the cake could be distilled off. Consequently if an alkaline catalyst of the quantity sufficient to saponify the residual acetate groups contained in the polyvinyl alcohol is added to the partially dried particles of polyvinyl alcohol, the amount of alkali consumed by the methyl acetate is very small.

As the resaponification reaction according to this invention proceeds during the drying step wherein the content of methyl acetate is very small, presence of water will not disturb the resaponification reaction. Thus, notwithstanding the fact that the saponification is effected at an elevated temperature, alkali metal hydroxide can be advantageously used in the same manner as alkali metal alcoholate. In this regard it is to be noted that it is another feature of this invention to effect mild heat treatment in the presence of water concurrent with the resaponification reaction in order to give such desirable property to the product that the resulting polyvinyl alcohol will not be dissolved in cold water but will be dissolved in hot water. In the majority of the examples to be described a small quantity of water is added during the drying step for the purpose of promoting the effect of this mild heat treatment. It is preferable to add water in the form of water-methanol mixture, and addition of such water may be made to a wet cake immediately after filtration, or to partly dried particles together with an alkali substance.

The fundamental conception of this invention resides in the removal of methyl acetate, having a tendency to an undesirable reaction with alkali in the course of resaponification, by means of filtration and partial drying of the filtered cake. Two approaches to the removal of methyl acetate are to evaporate all of the solvent matter in the slurry, or to wash the wet cake obtained by filtering the slurry with fresh methanol. Both of these approaches are not economical, because in the former, a large quantity of heat energy is required to remove methyl acetate owing to a large quantity of solvent to be evaporated, while in the latter an additional washing step and a large quantity of fresh methanol are required. According to the present process, however, as nearly all of the methyl acetate will be distilled off until an intermediate point of the usual cake drying step is reached, polyvinyl alcohol can be completely resaponified by continuing the drying step after adding a very small amount of alkaline catalyst at that point. Thus according to this invention, it is possible to continuously prepare highly saponified polyvinyl alcohol by a very simple and economical procedure, without requiring any special and expensive equipment and troublesome procedures.

The process of the present invention will be more fully understood with reference to the following examples.

EXAMPLE 1

To a solution consisting of 1 weight part of vinyl acetate and 0.67 weight parts of methanol was added 0.0003 weight parts of α,α-azo-bis-isobutyronitrile as a polymerization catalyst, and this mixture was polymerized at a temperature of 65° C. for 5 hours until a yield of polymerization of 70% was obtained. Thereafter unpolymerized vinyl acetate was distilled off by blowing methanol vapor into the solution to obtain a methanolic solution of polyvinyl acetate having concentration of 30%.

The $1/40$ mole of sodium methylate per one mole of polyvinyl acetate was added to the methanolic solution of polyvinyl acetate and the mixture was subjected to saponification reaction at 40° C., thereby obtaining a slurry in which polyvinyl alcohol was suspended. The slurry was then filtered to obtain a wet cake of polyvinyl alcohol containing about 50% of volatile components. This polyvinyl alcohol containing about 0.53 mole percent of the residual acetate groups was then dried at a temperature of 95° C. for about one hour until the volatile components were reduced to about 25%, whereby to obtain dispersed particles of polyvinyl alcohol containing about 0.26 mole percent of the residual acetate groups. $1/100$ mole of sodium methylate per one mole of polyvinyl alcohol was dissolved in a mixed solvent consisting of 15% of water and 10% of methanol based on the weight of polyvinyl alcohol, and the solution thus obtained was sprinkled over said partly dried dispersed particles to be mixed therewith. Finally the mixture was dried at a temperature of 95° C. for about two hours, thereby producing white powdery polyvinyl alcohol containing 2.46 weight percent of sodium acetate and 0.008 mole percent of the residual acetate groups. The total amount of alkali utilized in saponification was $1/28.6$ mole per one mole of polyvinyl alcohol.

EXAMPLE 2

The same procedures as in the Example 1 were repeated except that $1/500$ mole of sodium methylate was used in lieu of $1/100$ mole of sodium methylate, as the resaponification catalyst, to obtain white powdery polyvinyl alcohol containing 0.97 weight percent of sodium acetate and 0.042 mole percent of the residual acetate groups. The total quantity of alkali used amounted to $1/37$ mole per one mole of polyvinyl alcohol.

EXAMPLE 3

The same procedures as in the Example 1 were repeated except that $1/2000$ mole of sodium methylate was used in lieu of $1/100$ mole of sodium methylate, as the resaponification catalyst, to obtain white powdery polyvinyl alcohol containing 0.69 weight percent of sodium acetate and 0.0082 mole percent of the residual acetate groups. The total amount of alkali used amounted to $1/39.2$ mole per one mole of polyvinyl alcohol.

EXAMPLE 4

$1/80$ mole of sodium hydroxide per one mole of polyvinyl acetate was dissolved in a solution of polyvinyl acetate obtained by the Example 1, and the resulting solution was treated to effect saponification reaction at a temperature of 40° C. to obtain a slurry of polyvinyl alcohol.

The slurry was filtered, and the cake has contained about 50% of volatile matters. The content of residual acetate groups in the polyvinyl alcohol at that time was 0.73 mole percent.

The cake was partly dried at a temperature of 95° C. to reduce the content of the volatile matters thereof to about 25%, and particles of polyvinyl alcohol containing 0.50 mol percent of the residual acetate groups were produced. A solution was prepared by dissolving $\frac{1}{200}$ mole of sodium hydroxide per mole of polyvinyl alcohol in a mixed solvent consisting of 15% of water and 10% of methanol based on the weight of the polyvinyl alcohol and the resulting solution was sprinkled on and mixed with the partly dried particles of polyvinyl alcohol. Again the mixture was finally dried at a temperature of 95° C. for about 2 hours to obtain white powdery polyvinyl alcohol containing 1.39 weight percent of sodium acetate and 0.036 mole percent of the residual acetate groups. The total quantity of alkali used was $\frac{1}{57.1}$ mole per one mole of vinyl alcohol.

EXAMPLE 5

$\frac{1}{100}$ mole of sodium methylate per one mole of polyvinyl acetate was added into a solution consisting of 30% of polyvinyl acetate and 70% of methanol obtained by the Example 1 to effect saponification reaction at a temperature of 40° C. Upon completion of the reaction the slurry was filtered to obtain a cake of polyvinyl alcohol containing about 50% of volatile components and 1.02 mole percent of the residual acetate groups. The wet cake was dried while agitating until its volatile components have reduced to about 25% to obtain particles of polyvinyl alcohol containing 0.57 mole percent of the residual acetate groups.

A solution consisting of $\frac{1}{200}$ mole of sodium methylate per one mole of polyvinyl alcohol and 10 weight percent of methanol to the weight of polyvinyl alcohol was sprinkled on and uniformly mixed with said partly dried particles of polyvinyl alcohol, and again the mixture was finally dried at a temperature of 95° C. to obtain white powdery polyvinyl alcohol containing 0.87 weight percent of sodium acetate and 0.02 mole percent of residual acetate groups. The total amount of the alkali used was $\frac{1}{66.7}$ mole per one mole of polyvinyl alcohol.

EXAMPLE 6

A mixed liquid consisting of 15 weight percent of water and 10 weight percent of methanol to the weight of polyvinyl alcohol was added while agitating into the cake of the polyvinyl alcohol prepared by the procedures of the Example 4 and thereafter the mixture was partly dried at a temperature of 95° C. for about one hour to reduce the content of the volatile components to about 35%, thus providing particles of polyvinyl alcohol containing 0.62 mole percent of the residual acetate groups. Methanol solution containing $\frac{1}{200}$ mole of sodium hydroxide per one mole of polyvinyl alcohol was uniformly springled on said partly dried particles of the polyvinyl alcohol, and then the particles were finally dried at a temperature of 95° C. for 2 hours to obtain white powdery polyvinyl alcohol containing 1.30 weight percent of sodium acetate and 0.045 mole percent of the residual acetate groups. The total quantity of the alkali used was $\frac{1}{57.1}$ mole per one mole of polyvinyl alcohol.

EXAMPLE 7

The procedures of the Example 6 were repeated except that $\frac{1}{2000}$ mole of sodium methylate was used instead of $\frac{1}{200}$ mole of sodium hydroxide as the resaponification catalyst to obtain white powdery polyvinyl alcohol containing 0.46 weight percent of sodium acetate and 0.090 mole percent of the residual acetate groups. The total quantity of the alkali used amounted to $\frac{1}{76.9}$ mole per one mole of polyvinyl alcohol.

EXAMPLE 8

$\frac{1}{45}$ mole of sodium hydroxide per one mole of polyvinyl acetate was added to the solution consisting of 30% of polyvinyl acetate and 70% of methanol obtained in the substantially same manner as in the Example 1 to effect saponification at a temperature of 40° C. to obtain a slurry containing suspension of polyvinyl alcohol having an average degree of polymerization of 1200 and containing 0.45 mole percent of the residual acetate groups. This slurry was used for the continuous preparation of a highly saponified polyvinyl alcohol according to a process as diagrammatically shown in the drawing.

Referring now to the accompanying drawing, the slurry was continuously fed into a filter 2 via a pipe 1 at a rate of 20.0 kg./hr., and separated into a solid phase and a liquid phase. The filtrate was transferred to a solvent recovering device 14 through a pipe 4 at a rate of 15 kg./hr. The wet cake containing about 40% of volatile components was transferred to a primary drier 5 by means of a conveyor 3 at a rate of 5.0 kg./hr., where it was dried at a temperature of from 60 to 70° C. until its volatile components had reduced to about 20%. The particles of partly dried polyvinyl alcohol thus produced were then introduced into a mixer 7 to be mixed therein with an alkaline solution consisting of 12.5 g. of sodium hydroxide, 450 g. of water and 750 g. of methanol, which was supplied to the mixer 7 through a pipe 8 at a rate of 1.2 kg./hr. The mixture was then introduced into a secondary drier 10 where it was sufficiently dried at a temperature of from 95 to 100° C., the powdery polyvinyl alcohol product being continuously obtained through a discharge pipe 11 at a rate of 3 kg./hr.

The solvent evaporated in the primary and secondary driers 5 and 10 was fed to a condenser 12 via pipes 6 and 9, where it was condensed and the condensate was transferred to a subsequent solvent recovery step 13. It was noted that the powdery polyvinyl alcohol discharged from the discharge pipe 11 was of superior industrial quality containing about 2% of volatile components, 1.5% of sodium acetate, and 0.03 mole percent of the residual acetate groups, and having whiteness of about 90%. The term "whiteness" herein used means the reflective power of a light of a wavelength 420 mµ, taking magnesium oxide as the standard.

It will be understood that various changes and modifications may be made without departing from the scope of the invention as defined in the appended claims. It is intended, therefore, that all matters contained in the foregoing description and in the drawing are to be interpreted as illustrative only and not limitative of the invention.

What is claimed is:

1. A process for producing highly saponified polyvinyl alcohol containing less than 0.1 mole percent of residual acetate groups and, therefore, being suitable for dry spinning comprising:
    (1) adding from $\frac{1}{100}$ to $\frac{1}{10}$ mole of alkaline catalyst selected from the group consisting of sodium hydroxide and sodium methylate per mole of polyvinyl acetate to a solution of polyvinyl acetate in methanol to effect saponification of the polyvinyl acetate and producing a slurry of polyvinyl alcohol particles in a liquid;
    (2) filtering the resulting slurry to separate the solid particles from the major portion of the liquid, whereby the particles of polyvinyl alcohol are separated from most of the methyl acetate by-product and methanol present in said saponification mixture;
    (3) partly drying the separately recovered particles of polyvinyl alcohol by heating them to distill off between ⅓ and ⅔ of the volatile materials contained in the particles;
    (4) thereafter adding between from $\frac{1}{2000}$ to $\frac{1}{40}$ mole of said alkaline saponification catalyst per one mole of polyvinyl alcohol to said partly dried particles of polyvinyl alcohol;

(5) further drying the partly dried particles to effect final drying of the particles of polyvinyl alcohol with concurrent resaponification of residual acetate groups contained in said particles; and (6) recovering the dried polyvinyl alcohol, containing less than 0.1 mole percent of residual acetate groups.

2. The process of claim 1 wherein the alkaline catalyst is added as a solution in methanol.

References Cited

UNITED STATES PATENTS 2,481,388  9/1949  Bryant.
3,278,505  10/1966  Kominami.

JOSEPH L. SCHOFER, Primary Examiner

S. M. LEVIN, Assistant Examiner

U.S. Cl. X.R.

260—89.1